United States Patent [19]
Andersen et al.

[11] Patent Number: 5,129,761
[45] Date of Patent: Jul. 14, 1992

[54] PIPE PLACEMENT METHOD AND APPARATUS

[75] Inventors: Scott F. Andersen, Lake Oswego; Norman Hooper, West Linn, both of Oreg.

[73] Assignee: Constructors Engineering Co., Inc., Lake Oswego, Oreg.

[21] Appl. No.: 675,412

[22] Filed: Mar. 26, 1991

[51] Int. Cl.$^5$ ............................................. F16L 1/00
[52] U.S. Cl. ................................. 405/150.1; 405/146; 405/134
[58] Field of Search ............... 405/134, 135, 146, 150, 405/154, 169, 170

[56] References Cited

U.S. PATENT DOCUMENTS

| | | | |
|---|---|---|---|
| 2,807,937 | 10/1957 | Rhodes | 405/170 |
| 2,895,299 | 7/1959 | Washabaugh | 405/134 |
| 3,233,315 | 2/1966 | Levake | 405/170 X |
| 4,209,269 | 6/1980 | Martinez | 405/154 |
| 4,298,296 | 11/1981 | Hanson | 405/146 |
| 4,618,298 | 10/1986 | Takamiya et al. | 405/150 |
| 4,808,030 | 2/1989 | Takegawa | 405/146 |

Primary Examiner—Dennis L. Taylor
Attorney, Agent, or Firm—Robert L. Harrington

[57] ABSTRACT

A method and associated apparatus are shown for highly efficient manipulation of multiple pipe sections within the close confines of a tunnel formation to construct an underground conduit. Overall production is improved by adapting pipe section transport equipment to quickly deliver multiple pipe sections to a placement site and return immediately with the pipe carriages for a next load. Pipe section placement equipment is adapted to manipulate the pipe sections as delivered at the placement site, without any intermediate handling step, and position the pipe sections according to desired line and grade specifications.

19 Claims, 12 Drawing Sheets

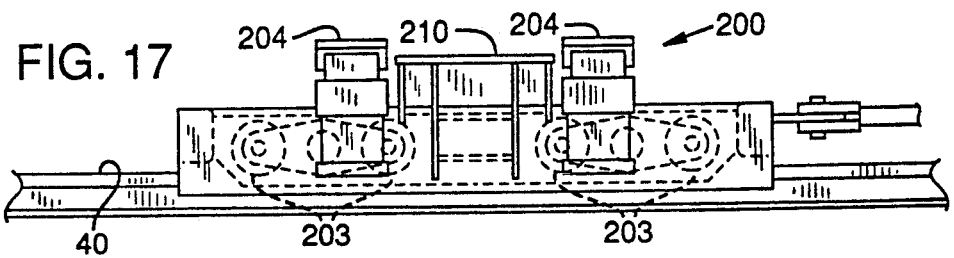
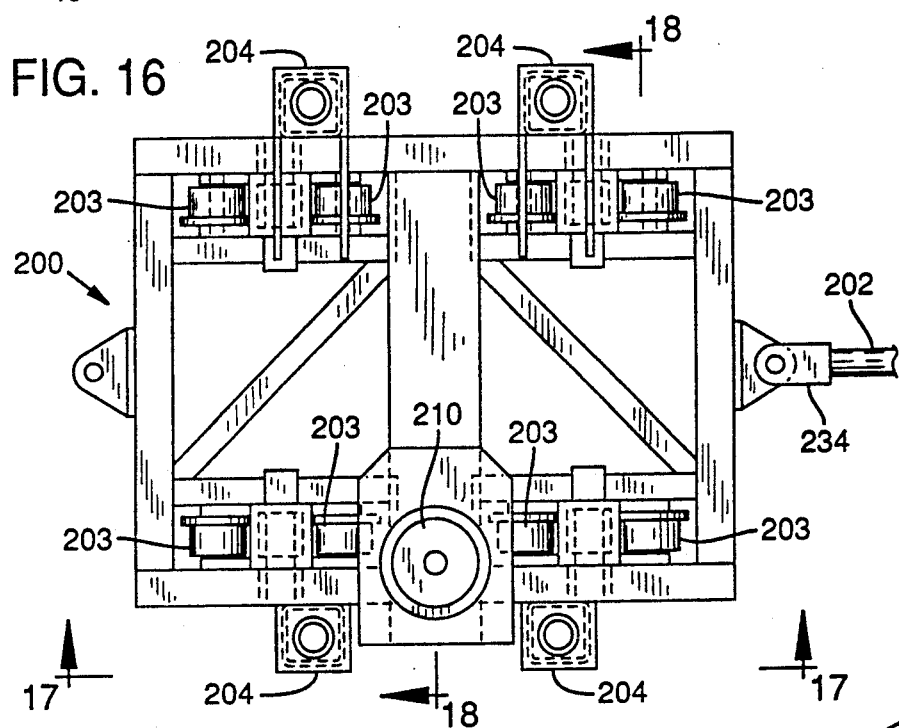
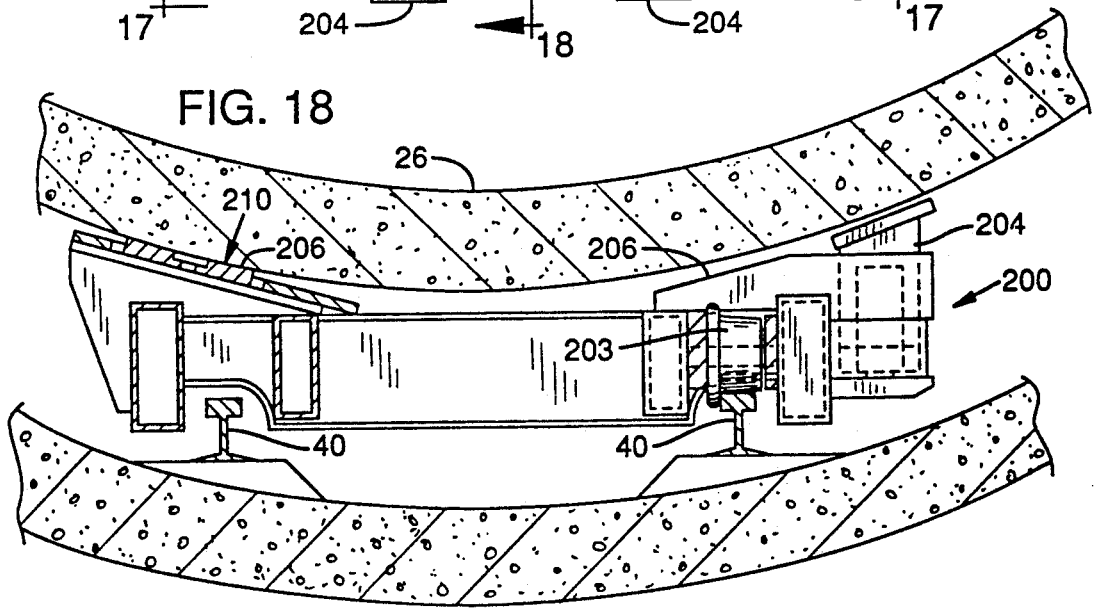

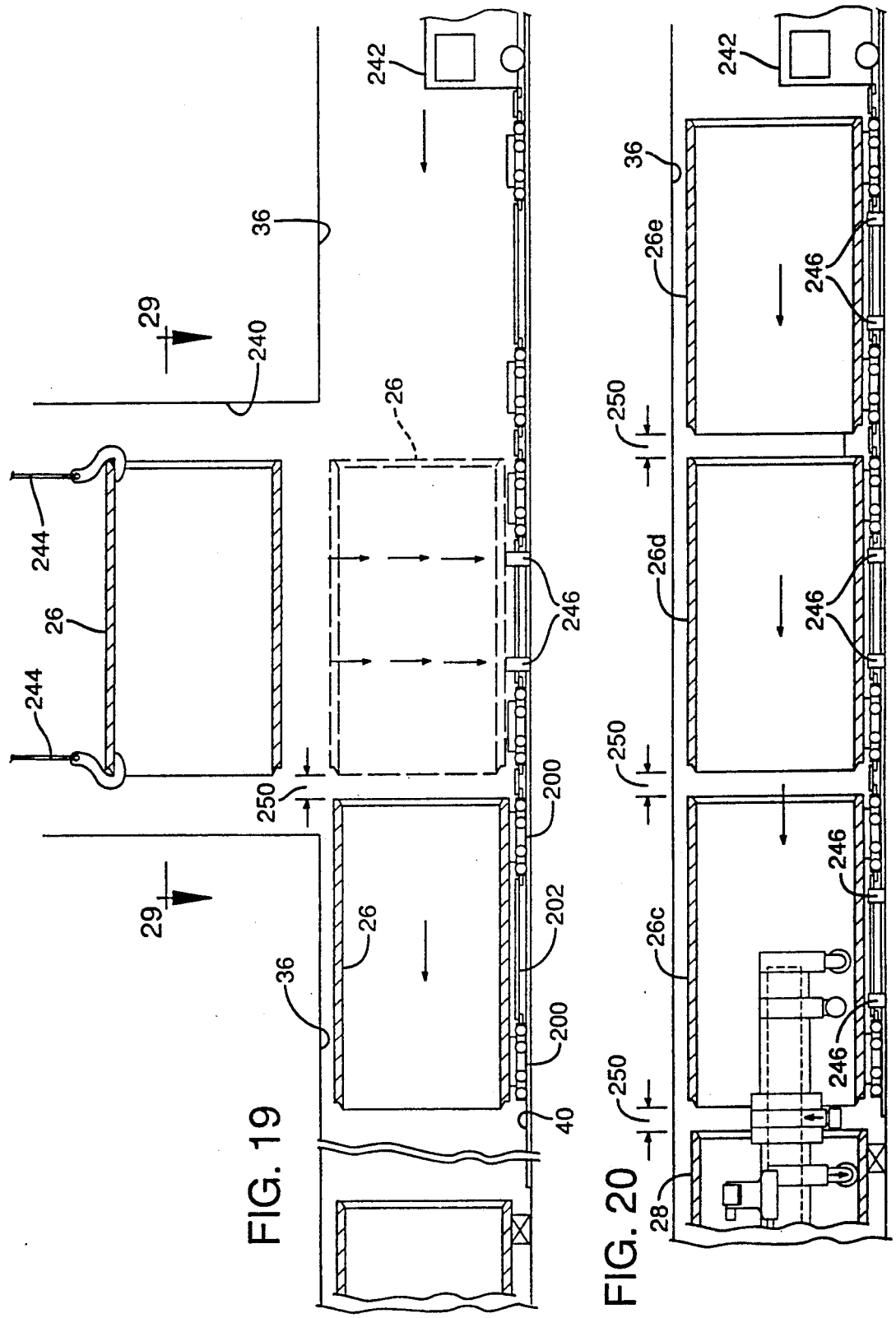

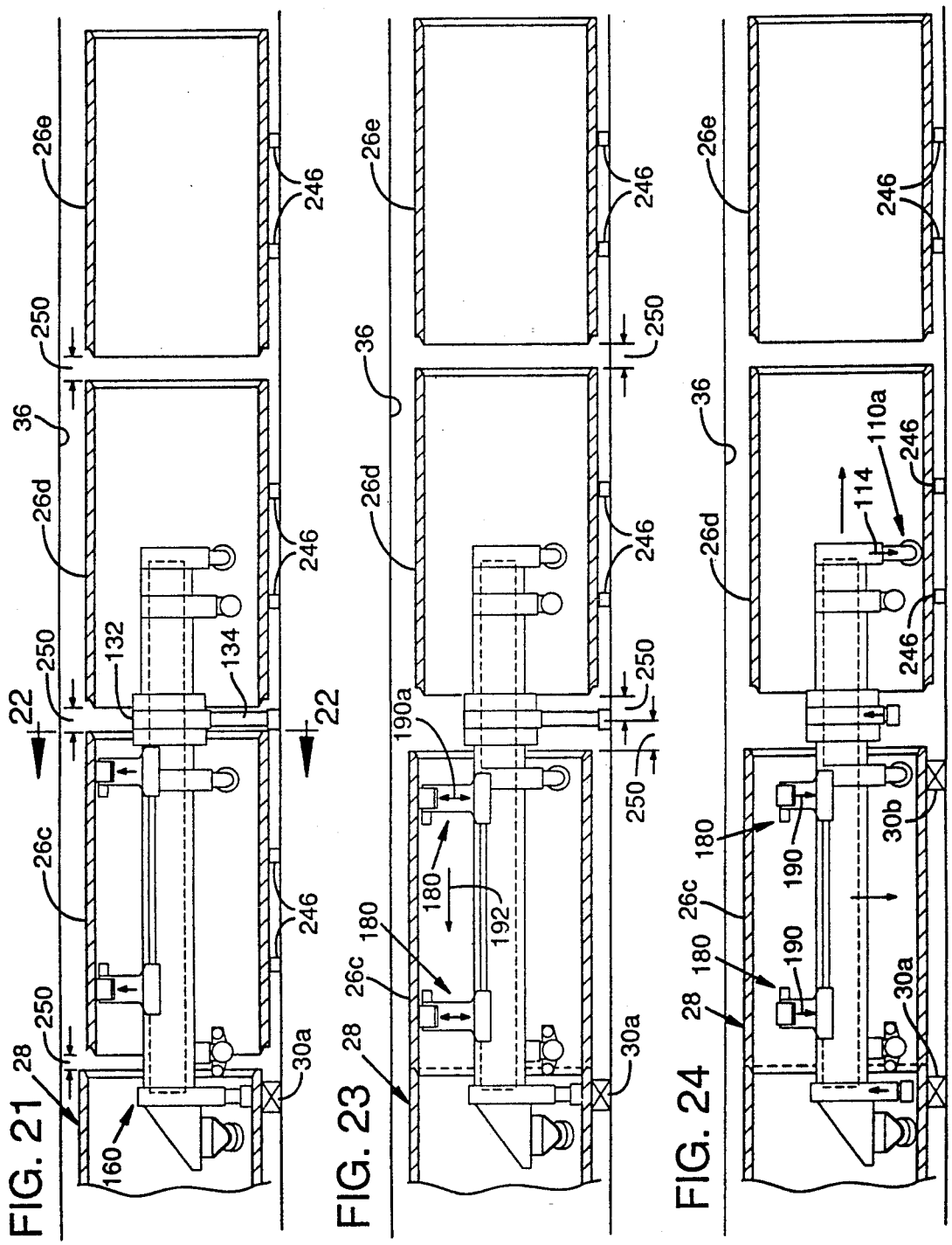

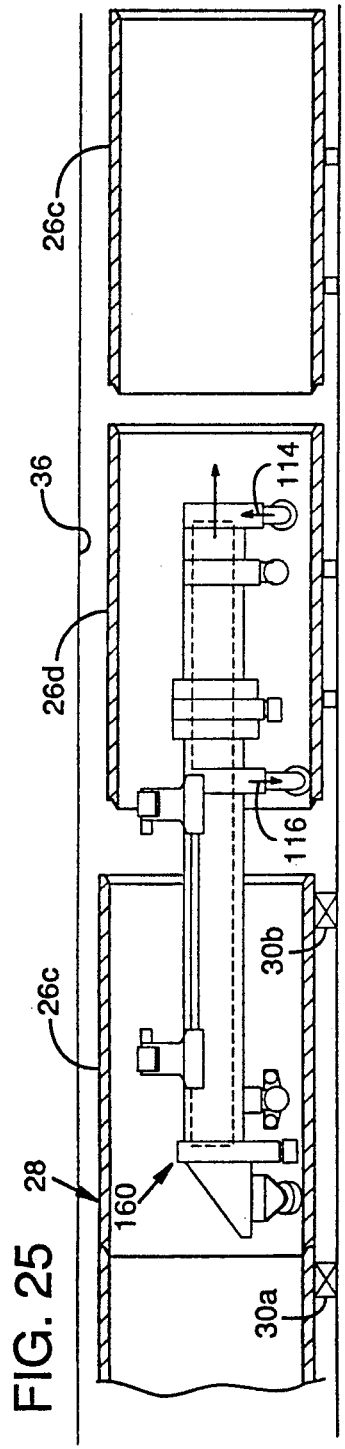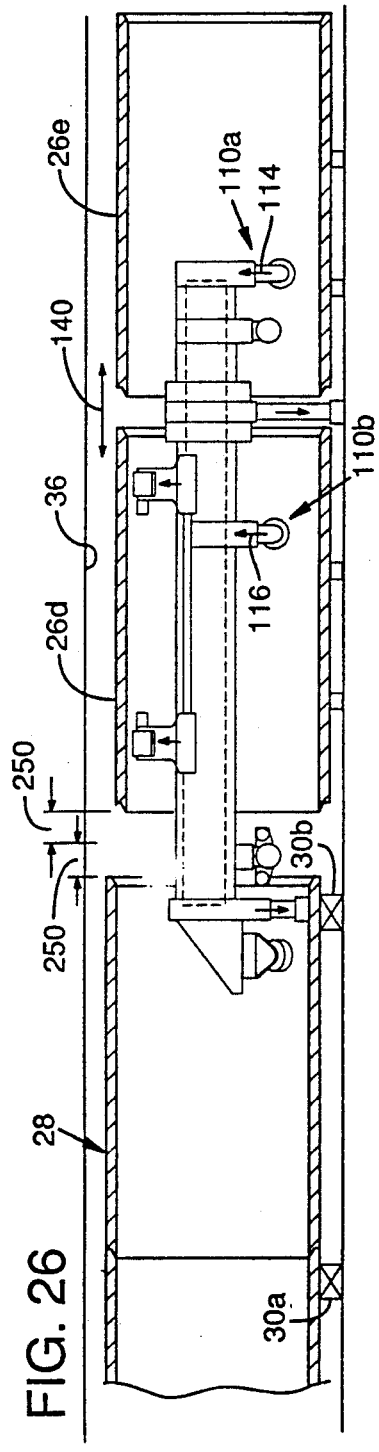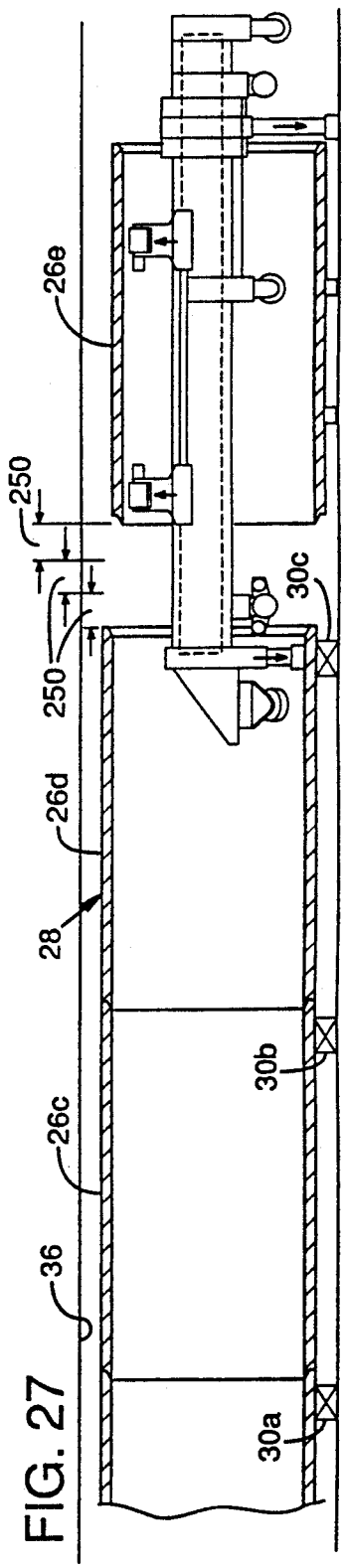

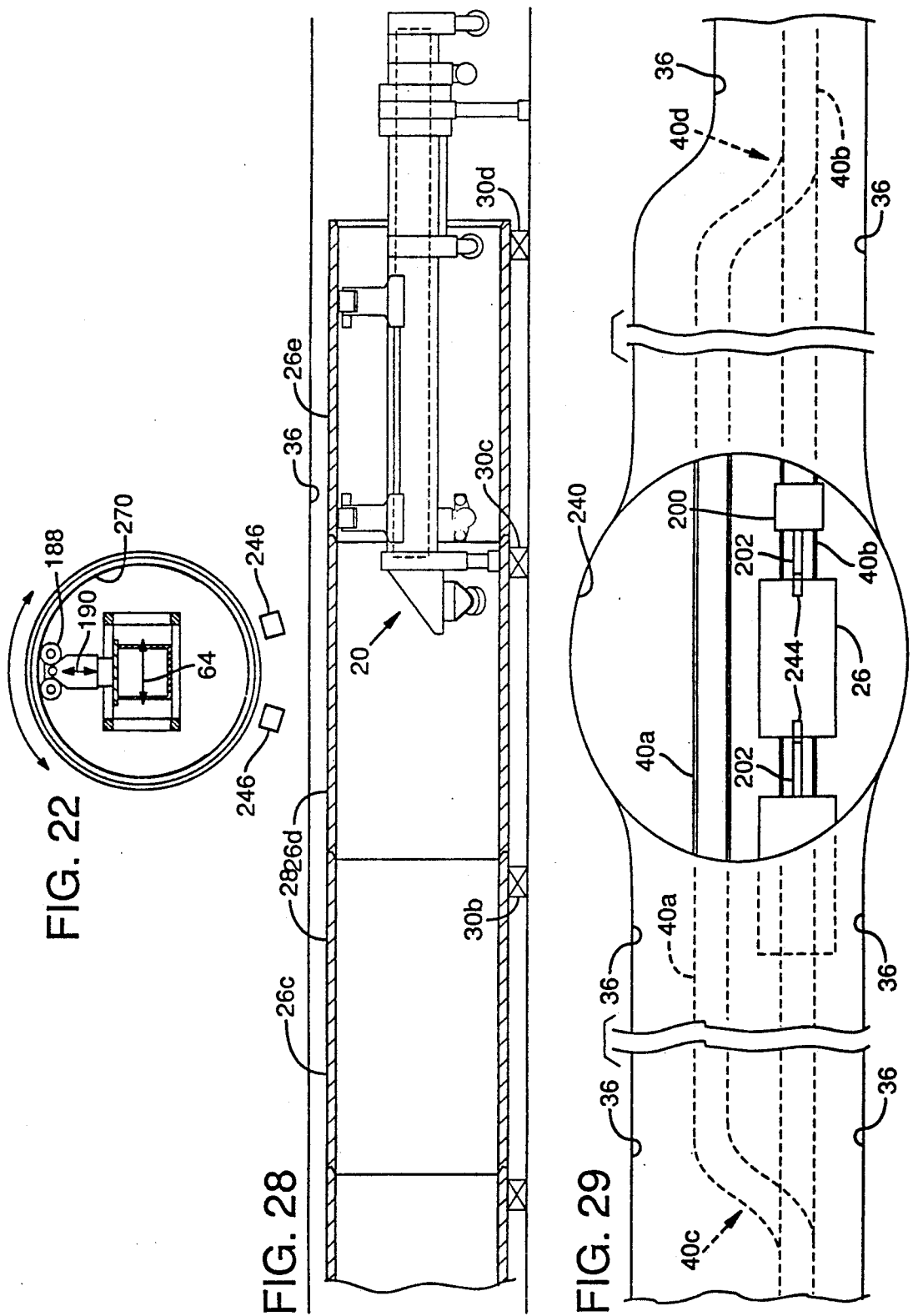

PIPE PLACEMENT METHOD AND APPARATUS

BACKGROUND OF THE INVENTION

The present invention relates generally to conduit construction equipment and methods, and particularly to pipe section placement equipment and a method of multiple pipe section manipulation and placement.

A traditional method of underground conduit construction is by casting length sections of conduit in place within a tunnel formation. An underground tunnel is first excavated along a line of intended conduit placement and a steel form is assembled within the tunnel to provide an inner cavity defining the conduit passageway. The annular region surrounding the steel form and extending to the tunnel wall is filled with high strength structural concrete. The structural concrete is placed around the steel form using concrete pumps and slickline drawn along the top of the form to fill the length of the annular region surrounding the forms. As the concrete cures, some voids at the tunnel arch may exist and must be filled using preplaced plumbing mounted along the tunnel arch. This cast-in-place method is limited to approximately 150 feet of conduit construction per day. Time is required for placement of the steel forms, for the concrete to cure and to fill the arch voids. Also, this cast in place method of conduit construction requires large volumes of expensive high strength structural quality concrete.

A more recent method of underground conduit construction is by end-to-end abutment and precise alignment of preformed steel reinforced concrete pipe sections within a tunnel formation. By using preformed pipe sections, the annular region of the tunnel exterior of the pipe section may be filled with less expensive concrete, i.e. lower strength cement, without degradation in overall conduit quality. Less material costs are incurred with respect to filling in the annular cavity, i.e., the tunnel volume exterior of the conduit because less high strength structural concrete is needed. Use of preformed pipe sections, however, introduces additional complexity with respect to delivery and manipulation of pipe sections within the tunnel formation.

A typical installation uses mating bell and spigot formations on abutting pipe section ends to accomplish section joining. In addition to precise longitudinal bell and spigot engagement and alignment of the pipe sections relative to line and grade requirements, pipe sections typically must be rotatably aligned. For example, each pipe section may have a portion of its inner surface treated or lined to be used as protection against gas related corrosion. Thus, pipe section placement often requires rotation about the longitudinal axis of each pipe section to align such portions prior to end-to-end abutment. For large conduit projects, individual pipe sections may be anywhere from 10 to 15 feet in diameter and 12 to 24 feet in length. The weight of these large pipe sections is enormous.

Typically a rail system is constructed along the length of the tunnel floor to transport muck from the digging operation. Once the tunnel is constructed, the pipe sections are brought into the tunnel using the same rail system. The rail system rails are typically along the centerline of the tunnel formation, but as a practical matter the intended line and grade of conduit placement varies from the tunnel center line. Accordingly, as the pipe sections are delivered by way of the rail system to the placement site, lateral shifting of the pipe sections is often required to bring the pipe sections in line with the intended line of conduit placement.

Once pipe placement begins at a given point in the tunnel, the pipe sections are delivered to the conduit only by way of the "open" portion of the tunnel, i.e. the portion without pipe sections in place. The rail system, therefore, is a limited resource with respect to pipe section transport. More particularly, because only a single rail system may be provided within a tunnel formation, only one locomotive transporting a single pipe section has been used on the rail system at any given time, either traveling to the placement site or returning from the placement site. The rail system is typically dismantled and removed from the tunnel as the conduit is constructed, but also sometimes left in place. Accordingly, the placement site can become cluttered and unworkable if not maintained by removal of items such as rail carts used to deliver pipe sections, portions of the dismantled rail system and other construction debris not forming a portion of the conduit. There is little room to manipulate the pipe sections even without such articles cluttering the placement site. Generally pipe section transport has represented a significant time consuming aspect of pipe placement.

Given the substantial size and weight of the pipe section, the need for precise, and in many cases extensive, manipulation prior to placement, and the need to maintain the placement site free of clutter, conduit construction by the method of preformed pipe sections has been slow. Each pipe section is individually transferred to the placement site, sometimes moved laterally from the rail system to alignment with the intended line of conduit placement, aligned rotationally with the conduit, abutted at its proximal end into the conduit, positioned at its distal end according to specified line and grade, and blocked at line and grade prior to filling the tunnel void exterior of the pipe sections. Such extensive manipulation of massive pipe sections and maintenance of the placement site within the close confines of the tunnel formation makes pipe section placement a complex task.

Prior methods of pipe section placement have been limited to single pipe section manipulation at a given time. Because of the need for extensive manipulation to accomplish pipe section placement and the limited transportation resources within the open portion of the tunnel, only one pipe section at a time is delivered to the pipe placement crew. While the pipe placement crew manipulates the pipe section for placement, the pipe transport crew returns to the tunnel opening to get the next pipe section. A significant time consuming activity has been pipe transport, and this has influenced the total amount of conduit construction possible in a given time period.

According to one prior method of conduit construction, a pipe transport machine moves a single pipe section down the tunnel on the rail system and places the pipe section at the open end of the conduit. A pipe placement machine positioned within the conduit performs the task of pipe section placement. Each pipe section must be individually placed immediately adjacent the conduit opening in order to allow the placement machine to lift and manipulate the pipe section into place. In this method of pipe placement, essentially only one unplaced pipe section resides within the tunnel at a given time. The tasks of pipe transport and pipe placement are sequential per individual pipe section and therefore limited to manipulation of but one pipe section.

According to prior methods of pipe section placement there always existed significant interdependence between the task of pipe transport to a suitable delivery point at the placement site and the task of pipe placement from the delivery point. This interdependence has limited the total number of pipe sections which could be placed in a given time period, and therefore contributed substantially to overall project costs.

SUMMARY OF THE INVENTION

A pipe placement method according to the present invention makes substantially independent the task of pipe section transport to a suitable delivery point at the placement site and the task of pipe placement beginning with manipulation from the delivery point. Pipe section transport and placement are coordinated to such extent to allow delivery of multiple pipe sections to the site of placement whereby a pipe section placement crew can manipulate the multiple pipe sections as delivered by a transport crew. This allows a pipe transport crew and a pipe placement crew to operate more independently, i.e., without waiting for the other, and, therefore, operate more efficiently.

In accordance with a preferred embodiment of the present invention, pipe placement equipment operates primarily from within the conduit, i.e. from already placed pipe sections. Several pipe sections to be placed are delivered in end-to-end predetermined spaced relation at the opening of the conduit. Pipe section transport equipment is adapted to quickly deposit the pipe sections in such spaced relation, retrieve the transport carts, and return to the tunnel opening to pick up the next load. The pipe section transport equipment thereby remains not only in substantially constant motion to and from the placement site, but maintains the placement site free of clutter such as transport carts as well as multiple pipe sections on each trip. A pipe placement machine emerges from within the conduit to lift and manipulate each pipe section from its position as deposited by the pipe transport equipment and into its final position. Overall production is greatly improved as the time consuming task of pipe section transport is executed more efficiently, i.e. multiple pipe sections versus the pipe section transported during each trip, and more independently, i.e., able to drop off the pipe sections without significant interaction with the pipe placement crew.

In accordance with the preferred embodiment of the present invention, pipe section placement begins with the pipe placement machine positioned within the conduit, i.e., within an already placed pipe section. A series of pipe sections to be placed are positioned substantially in line with the conduit but spaced apart a sufficient distance to accommodate axially movable, vertically retractable forward outrigger feet of the pipe placement machine. Vertically retractable rear outrigger feet are provided at the opposite end of the placement machine. The placement machine further includes vertically retractable pipe travel wheels and an associated drive mechanism for traveling within pipe sections, including an ability to travel through substantially aligned but spaced apart pipe sections. More particularly, an ability to traverse the increasingly wider gap between the conduit and the next and subsequent pipe sections to be placed as each of multiple pipe sections are manipulated from their position as deposited at the placement site.

The preferred embodiment therefore recognizes that several pipe sections should be transported to and positioned at the conduit opening in preparation for placement and that the placement machine should possess an ability to manipulate the pipe sections from their position as delivered at the conduit opening. Axial positioning of forward outrigger feet provides an ability to establish a space relationship between the distance separating the forward and rear outrigger feet and the changing distance between available support points for the outrigger feet as each of multiple sections are sequentially manipulated into position.

BRIEF DESCRIPTION OF THE DRAWINGS

For a better understanding of the invention, and to show how the same may be carried into effect, reference will now be made, by way of example, to the following drawings in which like reference numerals refer to like elements:

FIGS. 16-18 illustrate pipe section transport equipment for moving multiple pipe sections on a rail system and quickly depositing the pipe sections at a placement site.

FIGS. 19, 20 and 29 illustrate schematically loading of pipe sections upon transport equipment and delivery to a placement site within the tunnel formation.

FIGS. 21-28 illustrate schematically the sequential steps of pipe placement according to the preferred method of the present invention.

DETAILED DESCRIPTION OF A PREFERRED EMBODIMENT

The preferred embodiment and method of the present invention is applied to manipulation of preformed pipe sections in construction of an underground conduit. The preferred embodiment includes pipe section manipulation in loading and transporting the pipe sections within the tunnel formation as well as steps and apparatus associated with placement of the pipe sections at a placement site within the tunnel formation. The present description will begin with a discussion of the basic structural and operational aspects of the pipe section placement machine followed by a discussion of the pipe section loading and transport equipment. Once the structure and operation of the equipment is established, a description of the overall process will be illustrated with reference to schematic representations of the equipment.

As used herein, the term "conduit" shall refer to one or more individual pipe sections as finally positioned upon support blocks in a desired configuration prior to filling the tunnel void exterior of the conduit with concrete. Additional "float blocks" (not shown) may be positioned intermediate of the top of each pipe section 26 and the arch of tunnel 36 to prevent floating of pipe sections 26 when the tunnel void is filled with structural concrete. The term "pipe section" shall refer to individual pipe sections, typically prior to placement in their final position to form the conduit. The term "placement site" shall refer generally to the open end of the conduit including the area at which pipe sections to be placed are delivered. Accordingly, placement site refers to an advancing portion at the tunnel formation as conduit construction progresses.

Figure 1:
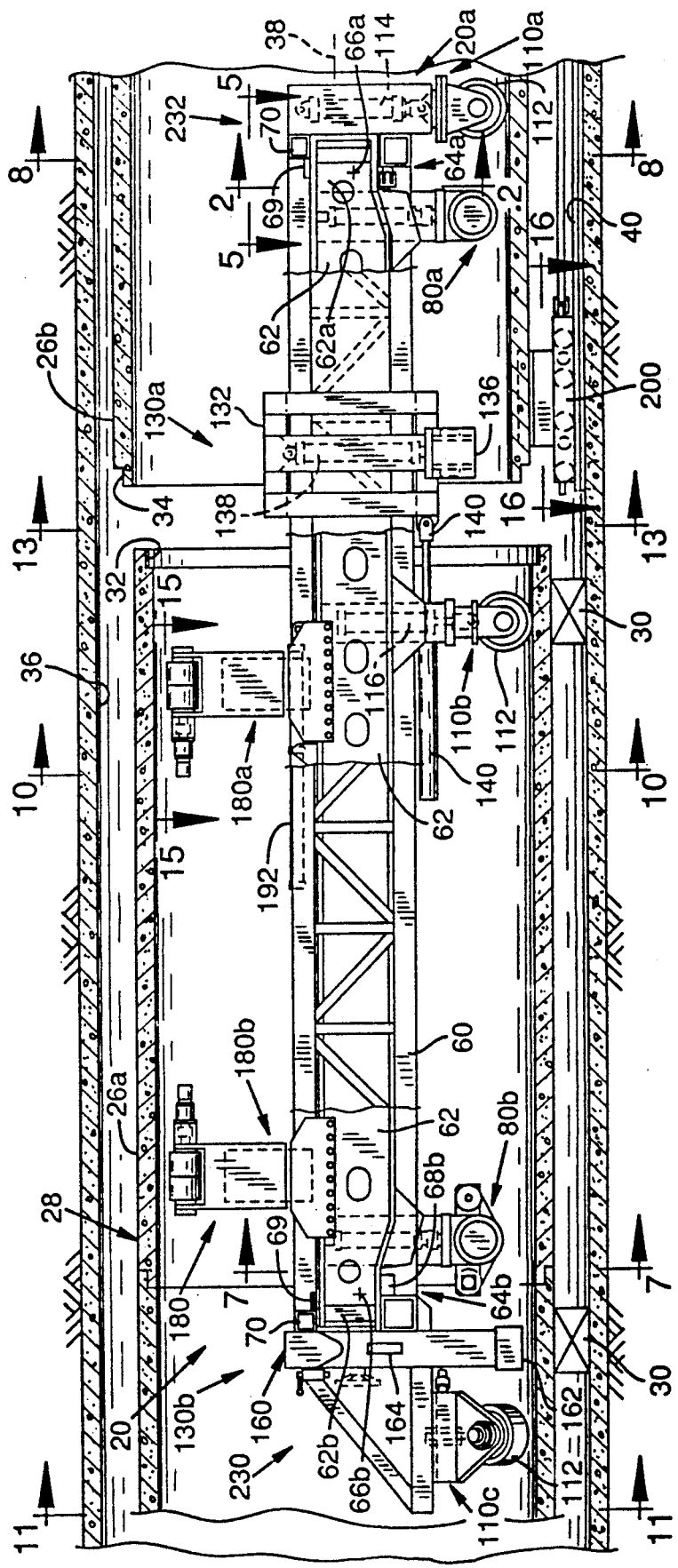
FIG. 1 is a side view partially broken away illustrating the general arrangement of a pipe placement machine according to the present invention.

FIG. 1 is a side view of a pipe placement machine 20 according to the present invention. Machine 20 manipulates individual pipe sections 26 for placement in end-to-end abutment to form a conduit 28. As depicted in FIG. 1, machine 20 rests within conduit 28 after completing placement of pipe section 26a. Additional pipe sections 26, of which only the pipe section 26b is shown in FIG. 1, have arrived by rail cars 200 at the placement site just prior to deposit thereat in preparation for placement by machine 20.

Figure 10:
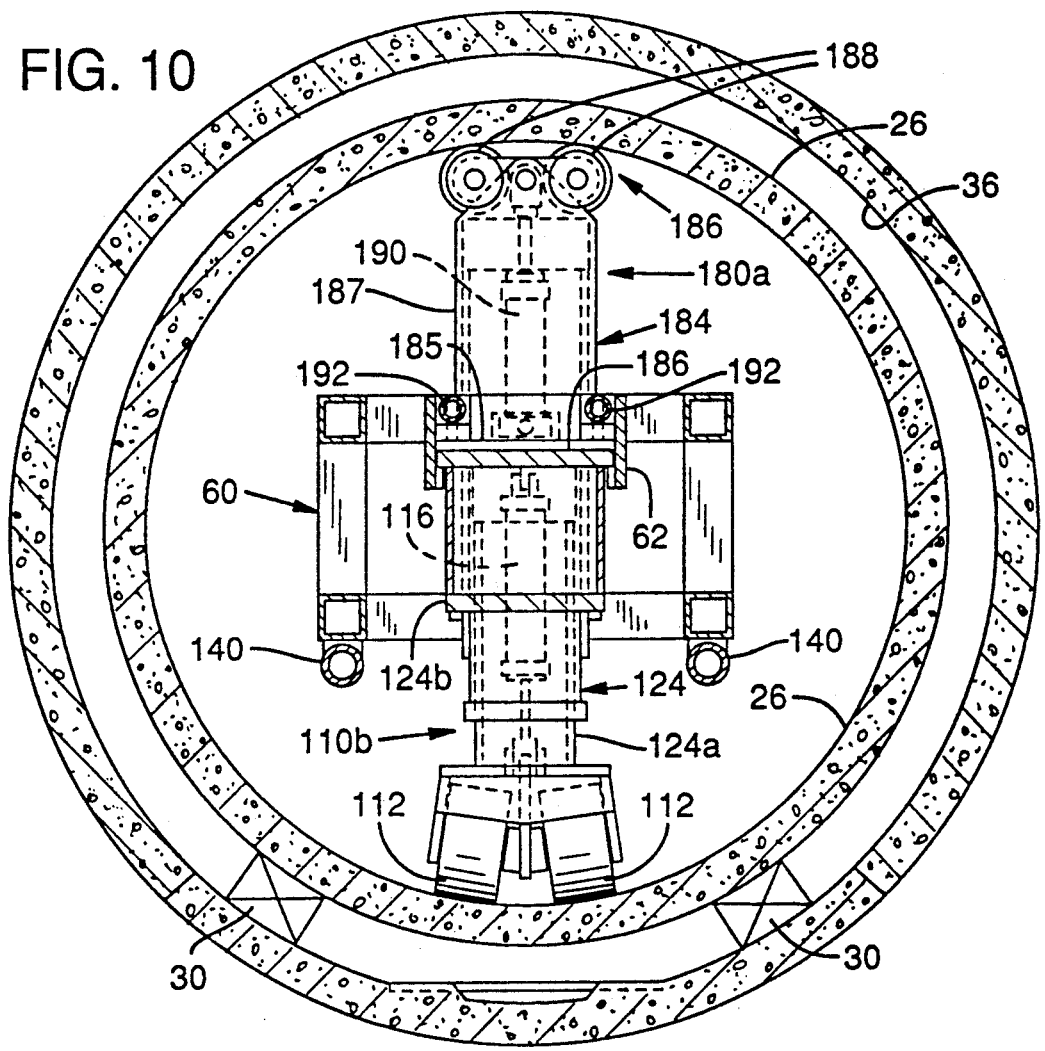

Mating bell formations 32 and spigot formations 34 at respective ends of each pipe section 26, allow end-to-end abutment of pipe sections 26. As each pipe section 26 is placed in its final position, a pair of support blocks 30, of which only one is shown in FIG. 1, are positioned below the distal end to secure the pipe section 26 in its final position. Each pipe section 26 is then supported at one end by a pair of blocks 30 and at the other end by the bell and spigot coupling to the adjacent pipe section 26. For a given pipe section 26, the pair of support blocks 30 are substantially at the same longitudinal point but each radially spaced approximately 30 degrees relative to a bisecting plumb line, e.g. as illustrated in FIG. 10. As practical matter, only the area below the distal end of the most recently placed pipe section 26 is accessible for block 30 placement and shimming. Access to other external portions of a pipe section 26 following placement is severely limited in the case of underground conduit construction where tunnel width and height is only slightly greater than pipe section 26 diameter.

Conduit 28 is constructed within an underground tunnel 36 which may be deep below the surface and extend thousands of feet in length. Tunnel 36 is excavated generally along line 38 representing the intended line and grade of conduit 28 placement. In constructing conduit 28, however, the longitudinal axis of each pipe section 26 must be accurately positioned relative to line 38 to establish a desired conduit line and grade. In excavating tunnel 36, a rail system 40 is constructed along the floor of tunnel 36. Rail system 40 is useful during tunnel excavation to haul debris from within tunnel 36. As explained more fully hereinbelow, rail system 40 is further used in construction of conduit 28 for delivery of pipe sections 26 to the pipe placement site within tunnel 36. Typically rail system 40 is placed along the center line of tunnel 36. The line 38 is not, however, necessarily coincident with the position of rail system 40 within tunnel 36. Accordingly, delivery of pipe sections 26 by way of rail system 40 to the opening of conduit 28 does not necessarily leave the pipe sections 26 along the line 38. Thus, in placing pipe sections 26 as deposited at the opening of conduit 28, it is often necessary to laterally reposition the pipe sections 26 in order to coincide with the line 38.

Pipe placement machine 20 includes an outer truss frame 60 and an inner needle beam 62 (shown in broken away portions of FIG. 1) supported within truss frame 60. Outer truss frame 60 captures needle beam 62 against upward and downward, in the view of FIG. 1, and axial movement relative to frame 60. Inner needle beam 62 otherwise has limited movement within a horizontal plane, as viewed in FIG. 1. A side shifter assembly 64 moves inner needle beam 62 within the horizontal plane and relative to outer truss frame 60. More particularly, a front side shifter assembly 64a couples front end 62a of needle beam 62 to truss frame 60 for moving end 62a along the horizontal front shift axis 66a. A similar rear side shifter assembly 64b couples rear end 62b of needle beam 62 and truss frame 60 for movement of end 62b along the horizontal rear shift axis 66b.

Figure 2:
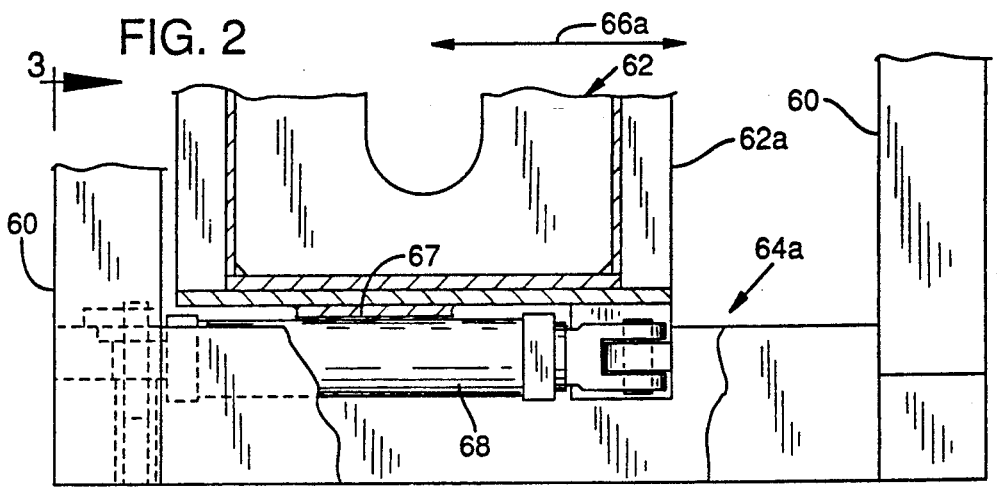
FIGS. 2-15 are various sectional views taken along corresponding lines of FIG. 1 showing structural details of the pipe placement machine of FIG. 1.
Figure 3:
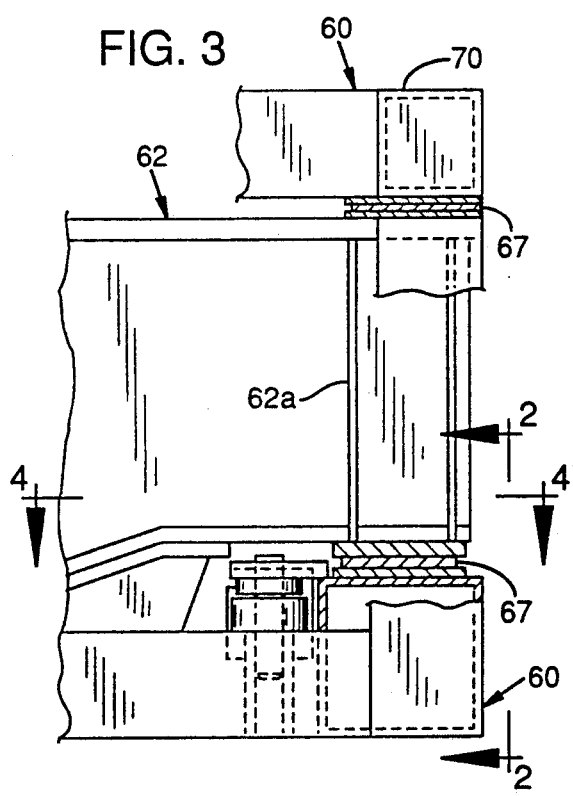
Figure 4:
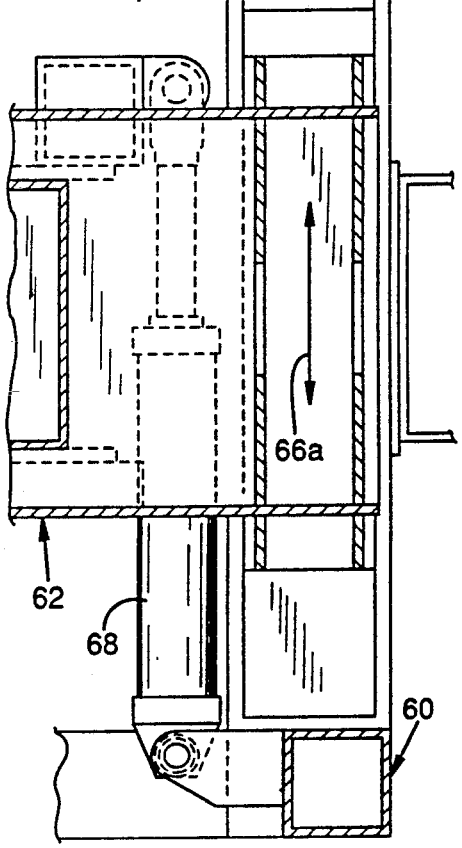

FIG. 2 is a sectional view of the machine 20 taken along lines 2—2 of FIG. 1 and illustrating the front side shifter assembly 64a. In FIG. 2, the inner needle beam 62 has horizontal freedom of motion within the confines outer truss frame 60, i.e., along the horizontal shift axis 66a. Outer truss frame 60 vertically supports needle beam 62 by way of a lower friction interface 67, partially shown in FIG. 2 but actually extending the width of frame 60. Lower friction interface 67 permits the desired horizontal movement of needle beam 62 upon frame 60 while blocking downward vertical movement thereof. A hydraulic cylinder 68 of shifter assembly 64a couples inner needle beam 62 and outer truss frame 60 and lies substantially parallel to the shift axis 66a. Accordingly, actuation of hydraulic cylinder 68 accomplishes movement of end 62a of needle beam 62 along the front shift axis 66a and relative to the outer truss beam 60. FIG. 3 is a view of the shifter assembly 64a taken along lines 3—3 of FIG. 2 showing an upper friction interface 67 interposed between needle beam 62 and a portion 70 of frame 60. Needle beam 67 is thereby captured vertically between upper and lower friction interfaces 67. FIG. 4 is a sectional view of side shifter assembly 64a taken along lines 4—4 of FIG. 3, but illustrating the hydraulic cylinder 68 extended to move the inner needle beam 62 near its opposite extreme as that illustrated in FIG. 2.

Figure 5:
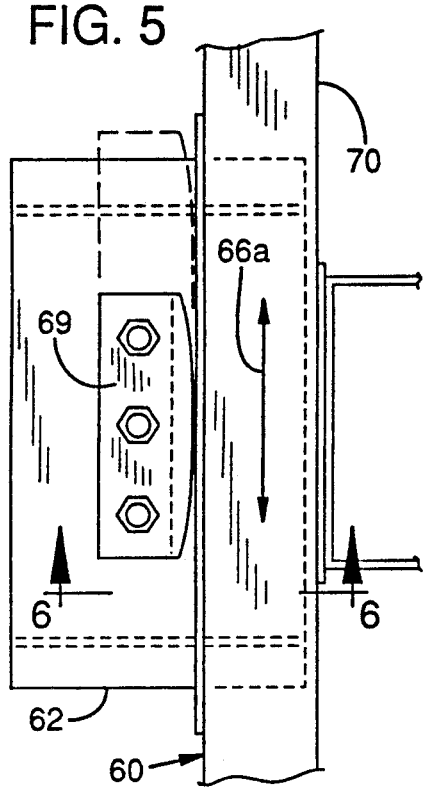
Figure 6:
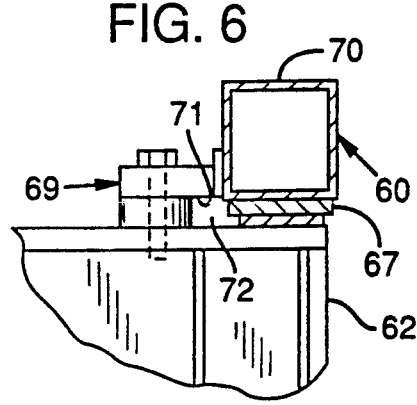

FIG. 5 is a top view of side shifter assembly 64a taken along lines 5—5 of FIG. 1 and FIG. 6 is a sectional view taken along lines 6—6 of FIG. 5. In FIGS. 5 and 6, inner needle beam 62 is held against axial movement relative to frame 60 by a thrust block 69 fixedly attached to inner needle beam 62 and adjacent the portion 70 of outer truss frame 60, the portion 70 being parallel to shift axis 66a. Thrust block 69 defines a lip formation 71 and portion 70 of outer truss frame 60 provides a protruding edge 72 adapted to fit within lip formation 71 whereby movement of inner needle beam 62 along the shift axis 66a is permitted, but axial movement of inner needle beam 62 relative to outer truss frame 60 is blocked by bumper 69. Also shown in FIG. 6 is the upper friction interface 67 as interposed between portion 70 of outer truss frame 60 and needle beam 62. Inner needle beam 62 is thereby held against upward and downward vertical movement as well as axial movement relative to outer truss frame 60 while permitting relative horizontal movement thereof.

Returning to FIG. 1, a similar side shifter arrangement 64b and thrust block 69 arrangement are provided at the rear end 62b of inner needle beam 62. It will be understood, therefore, that inner needle beam 62 is captured against vertical and axial movement but permitted horizontal movement according to actuation of side shifter assembly 64.

Figure 7:
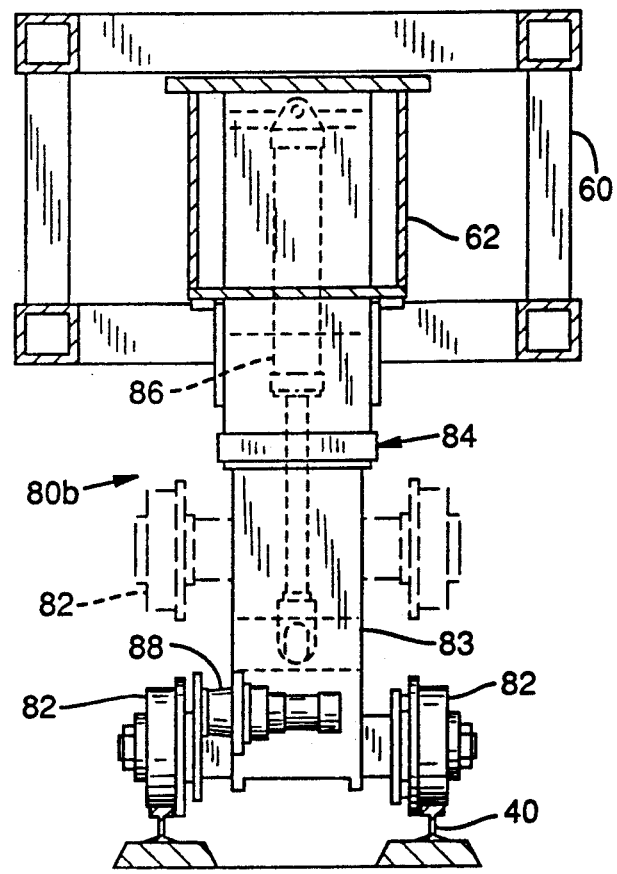

Continuing with FIG. 1, pipe placement machine 20 includes a rail transport assembly 80 for moving machine 20 along rail system 40. More particularly, rail transport assembly 80 includes a front rail transport assembly 80a and a rear rail transport assembly 80b. FIG. 7 is a sectional view of rear rail transport assembly 80b taken along lines 7—7 of FIG. In FIG. 7, the rear rail transport assembly 80b includes rail wheels 82 mounted upon a movable portion 83 of a vertically telescopic rail wheel frame 84. Frame 84 mounts to inner needle beam 62 as captured within outer truss frame 60. A rail wheel cylinder 86 couples the movable portion 83 of frame 84 and needle beam 62. Wheels 82 are thereby vertically positioned in accordance with actuation of cylinder 86. Assembly 80b further includes a drive motor 88 suitably coupled to wheels 82 for movement of machine 20 along rail system 40. The front rail transport assembly 80a is similarly configured for vertical telescopic positioning relative to inner needle beam 62, but does not include a drive motor. In operation, for transport along rail system 40, front and rear rail transport assemblies 80 lower to carry the weight of machine 20 by way of needle beam 62 an drive motor 88 propels machine 20 along rail system 40.

Returning now to FIG. 1, pipe placement machine 20 includes a pipe travel assembly 110 including a front travel assembly 110a, a middle travel assembly 110b, and a rear travel assembly 110c. The wheels 112 of each pipe travel assembly 110 are rubber wheels adapted for travel upon the inner surface of conduit 28 and pipe sections 26. The front travel wheel set 110a and middle travel wheel set 110b are each telescopic and vertically positionable, relative to machine 20, by actuation of cylinders 114 and 116, respectively. The rear travel wheel assembly 110c remains vertically fixed relative to machine 20. As explained more fully hereafter, front travel assembly 110a and middle travel assembly 110b enable machine 20 to "step over" or traverse the space between conduit 28 and pipe sections 26 during a pipe section placement operation. More particularly, with the front travel assembly 110a in its raised position, the forward end 20a of machine 20 may extend past a space separating pipe sections 26. The front travel assembly 110a is then lowered to carry the weight of machine 20 while the middle travel assembly 110b is raised. As explained more fully below, in placing multiple pipe sections 26 as deposited at the placement site, the space between the next and subsequent pipe section to be placed grows ever larger. Travel wheel assemblies 110a and 110b should, therefore, be sufficiently spaced apart to permit passage over the widest such gap between pipe sections. The space between pipe sections 26 is thereby traversed.

Figure 8:
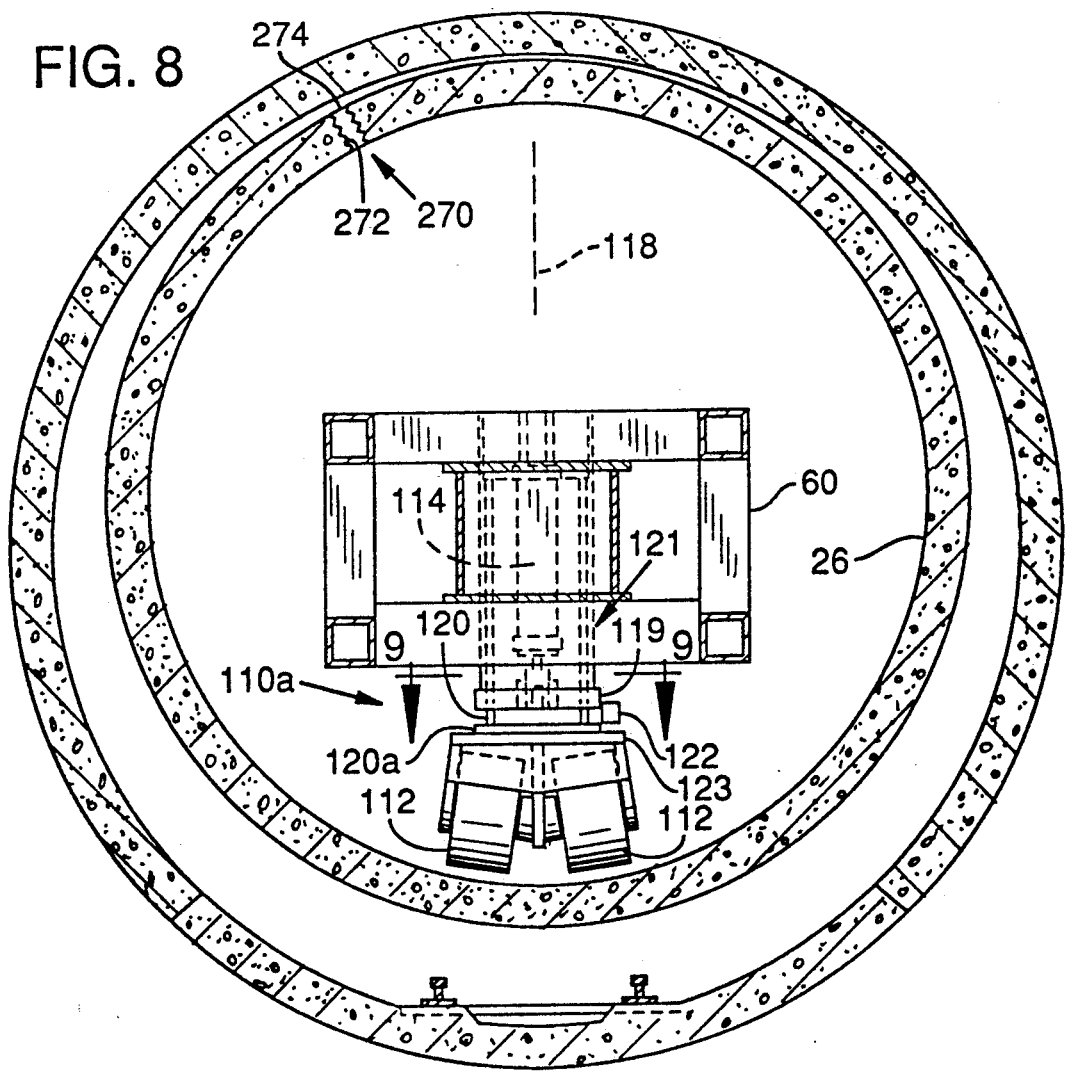

FIG. 8 is a sectional view of front travel assembly 110a taken along lines 8—8 of FIG. In FIG. 8, travel assembly 110a includes a pair of rubber wheels 112 mounted for rotation about axes of rotation inclined relative to a pipe section bisecting axis 118. Accordingly, the plane of rotation for each wheel 112 of assembly 110a is substantially normal to the inner surface of pipe section 26. Wheels 112 of assembly 110 are vertically positionable relative to outer truss frame 60 by actuation of hydraulic cylinder 114. More particularly, wheels 112 of assembly 110a mount upon a movable portion 120 of a telescopic frame 121. A stationary portion 119 of telescopic frame 121 attaches to outer truss frame 60. Cylinder 114 couples movable portion 120 and stationary portion 119 for vertical positioning of wheels 112 of assembly 110a relative to outer truss frame 60.

Figure 9:
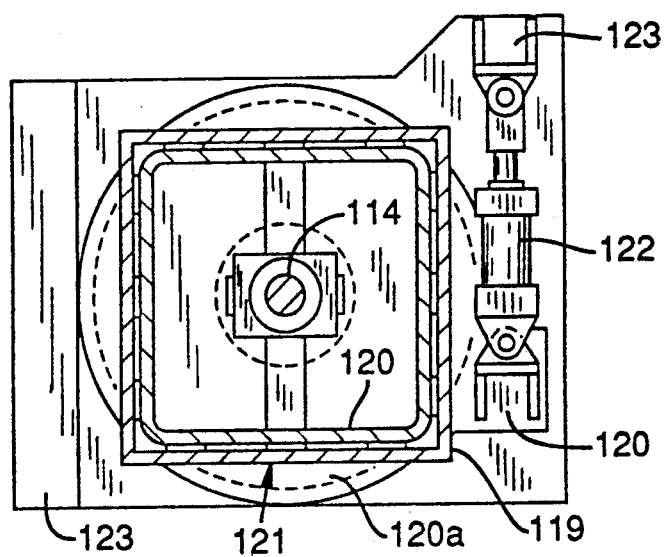

Also, front travel assembly 110a is steerable by actuation of a hydraulic cylinder 122 coupling movable portion 120 and a stationary portion of machine 20. FIG. 9 is a sectional view showing the steering arrangement of assembly 110a and taken along lines 9—9 of FIG. 8. In FIGS. 9 and 10, the cylinder 122 couples plate 120a affixed to the distal end of movable portion 120 of telescopic frame 121 with a wheel 112 support frame plate 123. Plate 123 rotatably mounts to plate 120a of frame 121 by way of a vertical bearing post (not shown) whereby actuation of cylinder 122 accomplishes steering rotation of wheels 112 about a vertical axis.

FIG. 10 is a sectional view of machine 20 taken along lines 10—10 and illustrating the middle travel assembly 110b. In FIG. 10, the travel wheels 112 of assembly 110b also mount on inclined axes of rotation to establish a normal orientation to the inner surface of pipe section 26. A telescopic frame 124 carries the wheels 112 of assembly 110b and provides vertical positioning thereof. A movable portion 124a of telescopic frame 124 carries the wheels 112 of assembly 110b while the stationary portion 124b thereof mounts to inner needle beam 62. The hydraulic cylinder 116 couples movable portion 124a and needle beam 62 whereby actuation of cylinder 116 moves wheels 112 of assembly 110b relative to inner needle beam 62.

Figure 11:
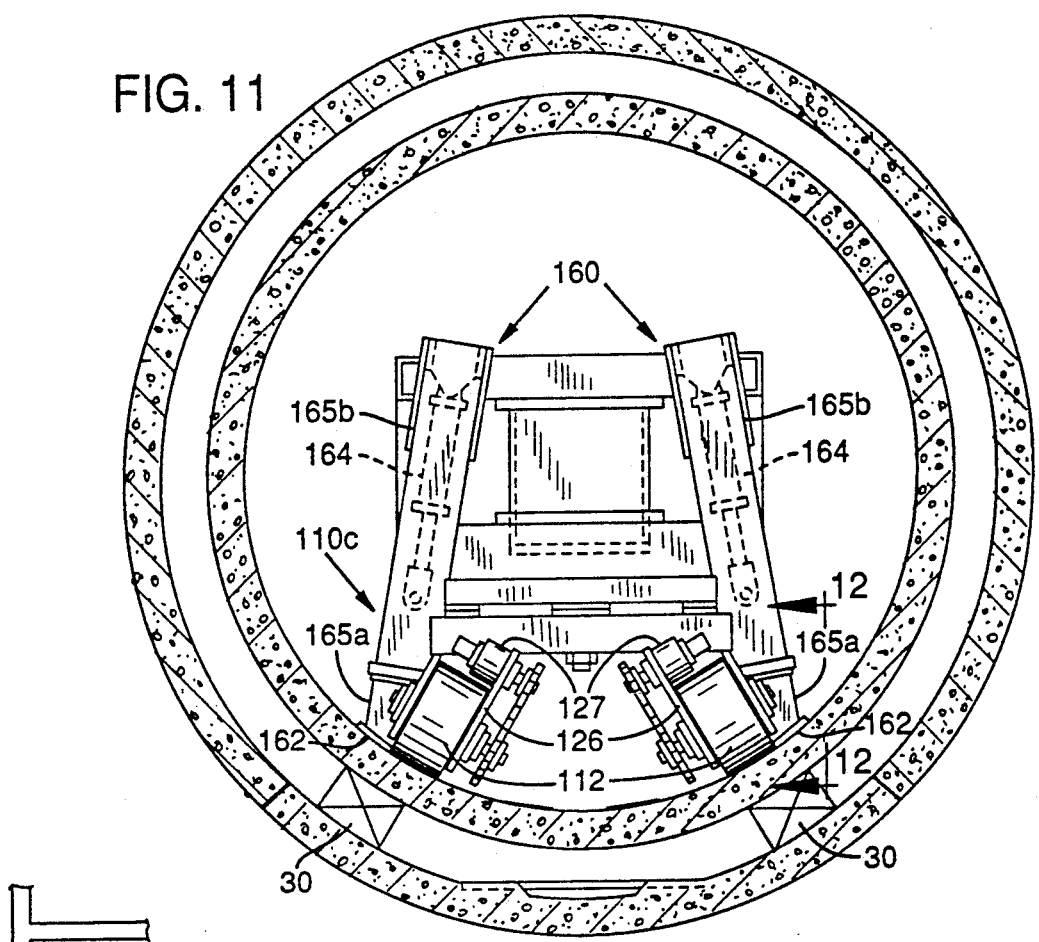

FIG. 11 is a sectional view of machine 20 taken along lines 11—11 of FIG. 1 and illustrating the rear travel assembly 110c. In FIG. 11, the wheels 112 of assembly 110c are more widely separated than that of front and middle assemblies 110a and 110b. Each wheel 112 of assembly 110c mounts on a separately steerable frame 126 rotatably attached to outer truss frame 60. Travel wheel drive motors 127 each mount on a respective ones of frames 126 and couple to respective one of wheels 112 to propel machine 20 within conduit 28 and pipe sections 26.

Figure 12:
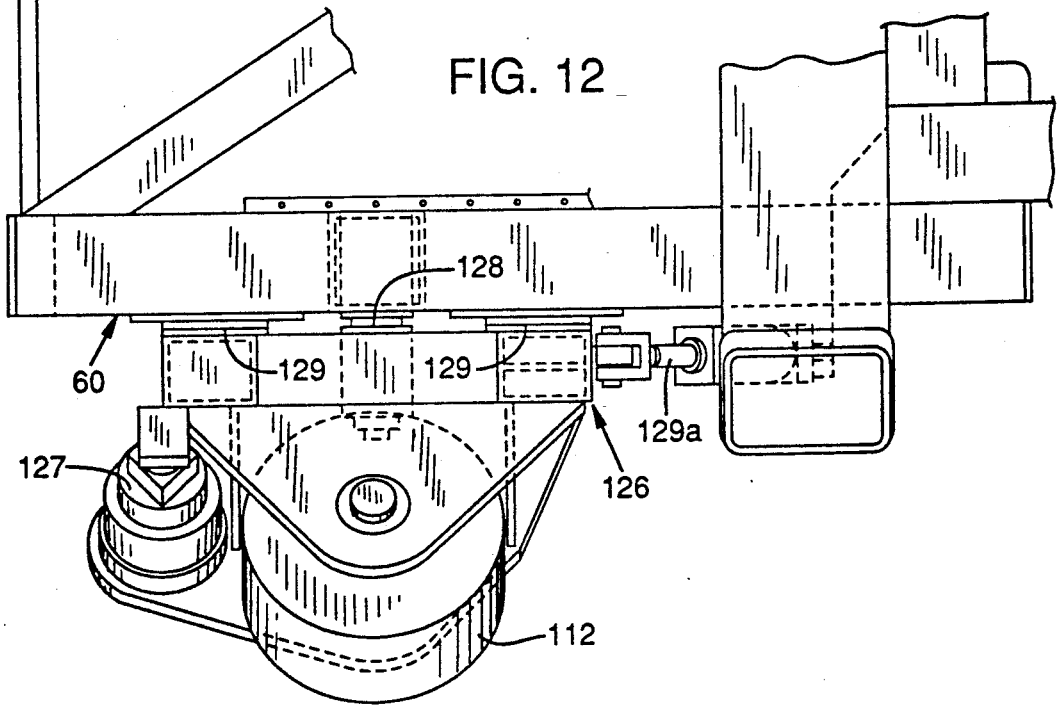

FIG. 12 is a side view of the rear travel assembly 110c taken along lines 12—12 of FIG. 11. In FIG. 12, each frame 126 rotatably mounts to outer truss frame 60 at a pivot post 128 and bears against frame 60 at friction surfaces 129. Hydraulic cylinders 129a couple respective ones of frames 126 to outer truss frame 60 whereby actuation of cylinders 129a steers rear travel assembly wheels 112.

Figure 13:
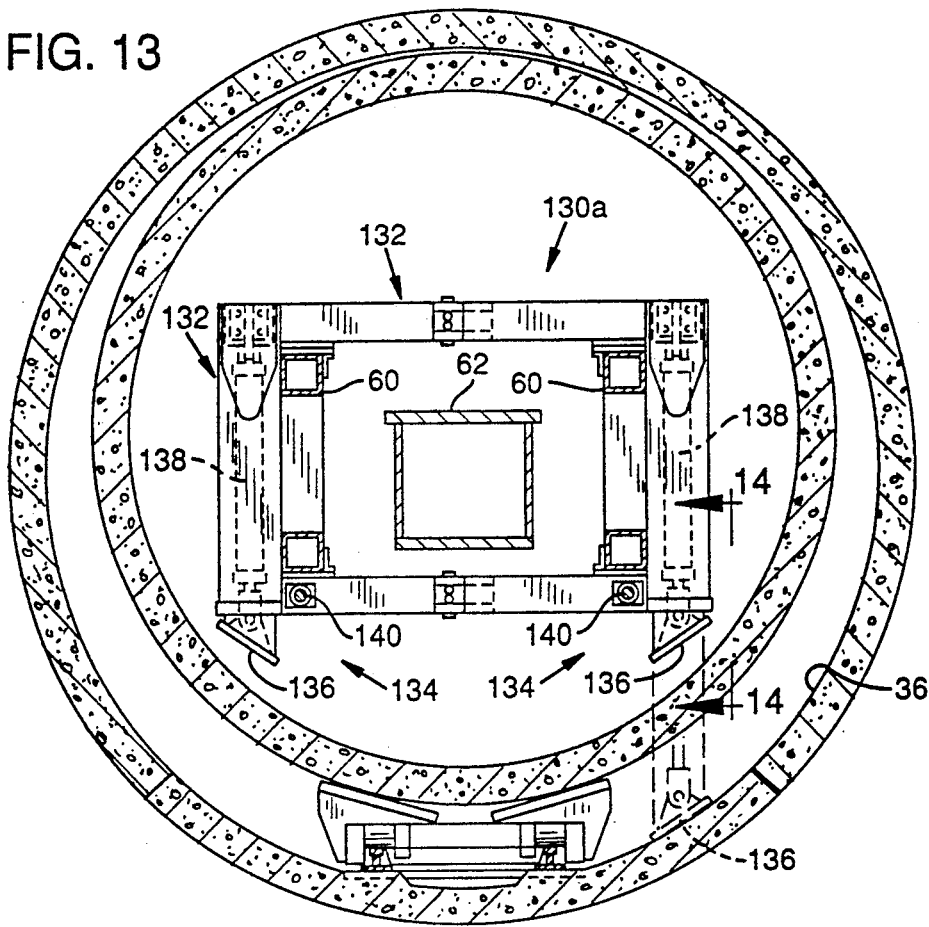
Figure 14:
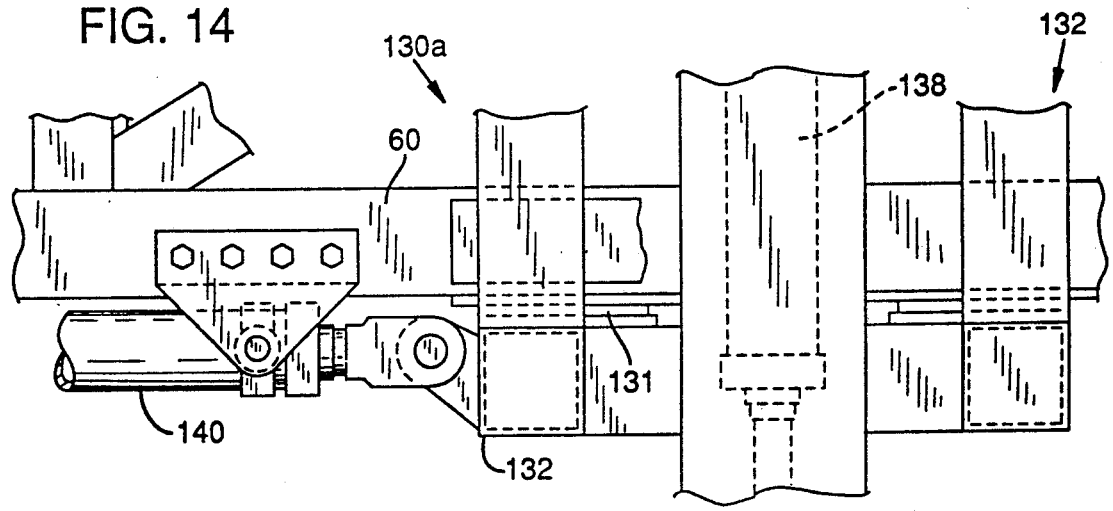

Returning to FIG. 1, an outrigger support assembly 130 of pipe placement machine 20 carries the weight of machine 20 and a pipe section 26 during pipe placement operations. A front outrigger support assembly 130a includes an axially positionable front outrigger carriage 132 slidably mounted to and surrounding the outer truss frame 60. FIG. 13 is a sectional view of machine 20 taken along lines 13—13 of FIG. 1 further illustrating the axially positionable front outrigger carriage 132. FIG. 14 is a side view, partially broken away, of the front outrigger carriage 132 taken along lines 14—14 of FIG. 13.

Referring now to FIGS. 1, 13 and 14, carriage 132 carries a front outrigger set 134. Front outrigger set 134 includes a pair of telescopically positionable outrigger feet 136 and a corresponding pair of front outrigger cylinders 138 for vertical positioning of feet 136. Outrigger feet 136 are pivotally mounted to accommodate the contour of tunnel formation 36 as feet 136 engage tunnel formation to support machine 20. A pair of front outrigger carriage cylinders 140 couple carriage 132 and outer truss frame 60 for axial movement of carriage 132 relative to frame 60. Carriage 132 is captured about outer truss frame 60 but slidable thereon by interposed friction pads 131, for example the lower friction pad 131 in FIG. 14. In operation, cylinders 138 actuate to lower outrigger feet 136 whereby outrigger feet 136 may carry the weight of machine 20. Prior to actuation of cylinders 138, however, cylinders 140 provide axial positioning of outrigger feet 136 relative to outer truss frame 60. Longitudinal positioning of outrigger feet 136 prior to use of outrigger feet 136 facilitates selective placement of multiple pipe sections 26. As explained more fully hereafter, longitudinal positioning of outrigger feet 136 enables machine 20 to obtain suitable support points in sequentially manipulating each of multiple pipe sections 26 as delivered for placement at the placement site.

With reference to FIGS. 1 and 11, a rear outrigger support assembly 130b further includes a rear outrigger set 160 having a pair of telescopically positionable outrigger feet 162 and corresponding rear outrigger cylinders 164. Each outrigger cylinder 164 actuates a corresponding telescopic frame 165 mounted to truss frame 60. Frames 165 are slightly inclined, flaring outward at their lower ends, but substantially vertical. The movable portion 165a of each frame 165 carries the corresponding outrigger foot 162 while the stationary portion 165b attaches to frame 60. Coordinated actuation of rear outrigger cylinders 164 vertically positions rear outrigger feet 162 whereby downward movement allows feet 162 to engage the inner surface of conduit 28 above a support block 30 to support machine 20. In operation, the outrigger support assembly 130 carries the combined weight of machine 20 and a pipe section 126 during pipe section placement.

Returning to FIG. 1, a pipe carriage assembly 180 of pipe placement machine 20 enables machine 20 to lift and manipulate individual pipe sections 26 for placement. Pipe carriage assembly 180 slidably mounts to inner needle beam 62 for longitudinal movement relative to machine 20. A front pipe carriage 180a, illustrated in the sectional view of FIG. 10, includes a telescopic upstanding frame 184. The stationary portion 185 of frame 184 slidably mounts to needle beam 62 at the friction surface 186 (FIG. 10). The upstanding movable portion 187 of frame 184 carries a pipe roller set 186 adapted for contacting the inner surface of a pipe section 26. A similar rear pipe carriage 180b includes a telescopic upstanding frame 184 also having a pipe contacting roller set 186. Front and rear pipe carriages 180a and 180b interconnect by fixed length ties (not shown) for coordinated, i.e. fixed separation, longitudinal movement in response to actuation of cylinders 192. The length of the interconnecting ties is a function of the length of the pipe section 26 to be lifted. The roller sets 186 are suitably separated to reliably support the pipe section 26 to be manipulated. Hydraulic cylinders 190, coupling portions 185 and 187 of frame 184 vertically position roller sets 186. Actuation of hydraulic cylinders 190 moves pipe roller sets 186 upward to engage, lift, and vertically position a pipe section 26.

Figure 15:
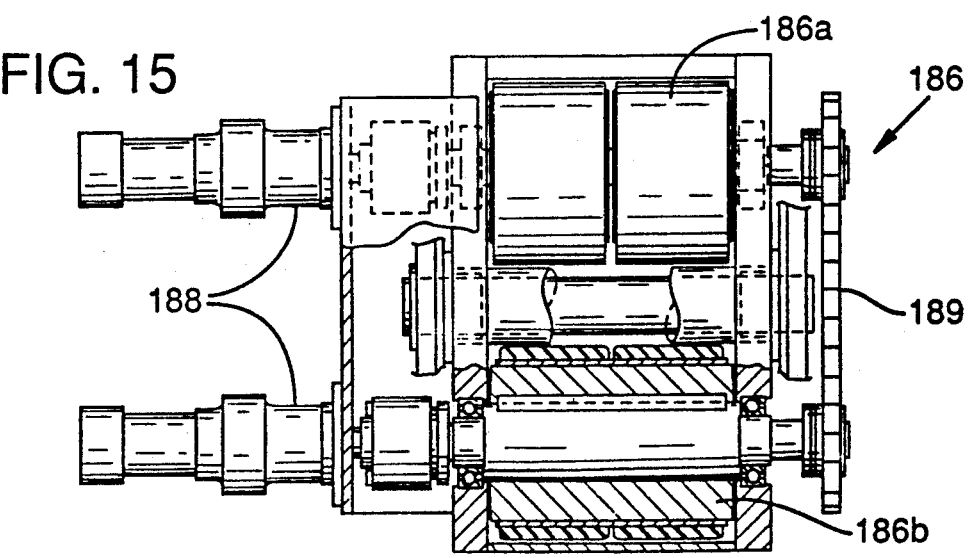

FIG. 15, taken along lines 15—15 of FIG. 1, shows a top view of a roller set 186. Each of roller sets 186 includes a pair of spaced rubber rollers 186a and 186b oriented in parallel relation to the longitudinal axis of a pipe section 26. Rollers 186a and 186b are direct driven by corresponding roller motors 188a and 188b. A belt 189 rotationally couples rollers 186a and 186b to maintain matching rotational speed therebetween. Actuation of motors 188, with roller sets 186 supporting a pipe section 26, accomplishes rotational positioning of the pipe section 26 prior to abutment with conduit 28. Pipe carriage assembly 180 is axially positionable along the inner needle beam 62 by operation of hydraulic cylinders 192, coupling pipe carriage assembly 180 and needle beam 62. Axial movement of carriage assembly 180 while carrying a pipe section 26 brings the pipe section 26 into abutment with conduit 18.

Returning now to FIG. 1, pipe sections 26 are moved to the placement site within tunnel 36 by way of rail system 40. Rail cars 200 are adapted to quickly deliver pipe sections 26 upon temporary support blocks at the placement site and return immediately to the tunnel 36 opening for the next load. FIG. 16 is a top view of a rail car 200 taken along lines 16—16 of FIG. 1. FIGS. 17 and 18 are sectional views taken along lines 17—17 and 18—18, respectively, of FIG. 16 and illustrate the rail car 200. Each pipe section is supported by two rail cars 200 interconnected by a tongue 202.

Referring now to FIGS. 16-18, each rail car 200 includes rail wheels 203 adapted for travel on rail system 40 and four upstanding hydraulic jacks 204 adapted to engage and carry a pipe section 26. As explained more fully hereafter, a pipe section 26 may be supported on temporary blocks maintaining the pipe section 26 at sufficient height for positioning of a rail car 200 thereunder. Upward movement of jacks 204 engages and raises the pipe section 26 to transfer the pipe section 26 to the rail car 200.

Rail cars 200 define a cradle formation 206 upon which the pipe section 26 may rest during transit. Cradle formation 206 is desirably rubber mounted to the body 208 of rail car 200 as at the flexible interface 210. Because two rail cars 200 are used for each pipe section 26, the flexible interface 210 between cradle formation 206 and body 208 accommodates stresses developed between pipe section 26 and rail car 200 as rail car 200 traverses curved portions of rail system 40.

A control station 230 of machine 20 includes all necessary controls for operation of the various cylinders and motors described herein. A power plant 232, e.g. diesel motor, positioned at the forward end 20a of machine 20 suitably provides the necessary energy by hydraulic fluid circuits to actuate the hydraulic devices of machine 20. An operator positioned at station 230 thereby actuates the various devices of machine 20 to manipulate pipe sections 26 as described herein. As for locomotive 242, the hydraulic jacks 204 of rail cars 200 are suitably connected to controls of locomotive 242 for operation of jacks 204 from within locomotive 242. In the illustrated embodiment, hydraulic lines 234 (FIG. 16) are routed along tongues 202 to provide control of jacks 20 from within locomotive 242.

Having shown and described the basic structure and operation of the equipment used in the transport and placement of pipe sections 26, reference will now be made to schematic representations of the equipment to illustrate the overall process of multiple pipe section 26 manipulation and placement beginning with introduction of pipe sections 26 into tunnel formation 36.

FIG. 19 illustrates a loading operation depositing pipe sections 26 upon an assembly of rail cars 200 interconnected by tongues 202. In FIG. 19, a downshaft 240 provides access to tunnel 36 for delivering pipe sections 26 into tunnel 36. A locomotive 242 operable on rail system 40 couples to the assembly of rail cars 200 for movement thereof along the rail system 40. A crane 244 delivers pipe sections 26 downward through shaft 240 to the tunnel formation 3 and onto temporary blocks 246 at the base of downshaft 240. The method of the present invention is not limited to loading of rail cars 200 by way of a downshaft as some conduit tunnels open, for example, at ground level. In such case pipe sections 26 may be loaded on rail cars at the tunnel opening at ground level and possibly by means other than crane 244. The temporary blocks 246 are laterally separated widely enough to accommodate travel therebetween of rail cars 200 and of sufficient height to allow passage of rail cars 200, with jacks 240 lowered, under a pipe section 26 as placed thereon. In the view of FIG. 19, only two temporary blocks 246 are visible, however, four temporary blocks are actually used for support of each pipe section 26. Each pair of blocks 246 corresponding to one of the temporary blocks 246 visible in FIG. 19 and positioned in similar arrangement to that of permanent blocks 30, i.e., on each side of rail system 40. After a pipe section 26 is lowered by way of crane 24 onto temporary blocks 246, locomotive 242 moves a pair of rail cars 200 under the pipe section 26 resting upon temporary blocks 246. Once the rail cars are so positioned, jacks 204 are actuated to lift and carry the weight of pipe section 26. Locomotive 242 is then actuated to move the next set of rail cars 200 to the base of downshaft 240 to receive the next pipe section 26.

In loading the pipe sections 26 upon the assembly of rail cars 200 in this manner, it may be appreciated that relative spacing between pipe sections 26 as loaded upon rail cars 200 is established by suitably positioning each set of rail cars 200 relative to the pipe sections 26 prior to actuation of jacks 204. More particularly, as loaded upon the assembly of rail cars 200, a distance 250 separates each pipe section 26. As explained more fully hereafter, the distance 250 is sufficient to allow passage of outrigger feet 136 whereby machine 20 obtains a foothold between pipe sections 26 to be placed.

Referring now to FIG. 20, locomotive 242 then moves the pipe sections 26 along tunnel 36 to the placement site at the opening of conduit 28. As previously noted, the relative spacing by the distance 250 between pipe sections 26 is established as of the time of arrival at the pipe section placement site. The forward most pipe section 26c may also be positioned relative to the opening of conduit 28 by the distance 250. In preparation for the arrival of pipe section 26 by way of locomotive 242 and rail cars 200, a set of temporary blocks 246 are positioned for each of the pipe sections 26. Upon arrival of pipe sections 26 and positioning thereof over the temporary blocks 246, jacks 204 are actuated to lower each pipe section 26 onto the corresponding set of temporary blocks 246. Locomotive 242 is then free to back away from the pipe section placement site and return immediately to the opening of tunnel 36 with the rail cars 200 for loading of additional pipe sections 26 by way of downshaft 240.

Pipe placement machine 20 stands ready to emerge from conduit 28 and manipulate the pipe sections, as delivered by locomotive 242, for placement and incorporation into the conduit 28. It should be appreciated that no intermediate repositioning of pipe sections 26 is needed, machine 20 is capable of manipulating pipe sections 26 from their positions upon temporary blocks 246.

Referring now to FIG. 21, machine 20 begins placement of pipe section 26c by first positioning rear outrigger set 160 over the blocks 30a near the opening of conduit 28, positioning forward outrigger set 134 just past the distal end of the pipe section 26c by movement of carriage 132, and lowering outrigger sets 134 and 160 to support the weight of machine 20. Outrigger sets 134 and 160 thereby provide a stable platform for machine 20 during pipe section placement. Also, outrigger sets 134 and 160 establish frictional contact with tunnel 36 and conduit 28, respectfully, for driving a pipe section 26 into abutment with conduit 28. Important to note, abutting stresses imposed on conduit 28 are limited to the last pipe section 26 of conduit 28. Prior methods of abutment engaged deeper portions of conduit 28 and often resulted undesirably in damage to already placed pipe sections 26. Pipe carriage assembly 180 is now within the pipe section 26c and roller sets 186 are raised to lift and manipulate the pipe section 26c. At this time, the temporary blocks 246 under pipe section 26c may be removed by lifting pipe section 26c a sufficient distance to allow access to temporary blocks 246, or to allow access to ropes tied to temporary blocks 246 and extending to the space separating pipe sections 26c and 26d. Alternatively, given sufficient space, blocks 246 may be removed following placement of pipe section 26c.

As machine 20 emerges from conduit 28 to enter a pipe section, the pipe section may be offset laterally relative to the center of conduit 28. This results from the fact that the pipe sections 26 as delivered lay along on the line of rail system 40 but rail system 40 is not necessarily coincident with the line and grade of conduit 28. As previously described, the front travel assembly 110a mounts to the outer truss frame 60 while the middle travel assembly 110b mounts to the inner needle beam 62. To accommodate the lateral offset of a pipe section 26 relative to conduit 28, the side shifter assembly 64 is available to laterally position front travel assembly 110a over the center of the pipe section 26 prior to transfer of machine 20 to front travel assembly 110a. More particularly, because at this time the middle travel assembly 110b carries the weight of machine 20 and it mounts to inner needle beam 62, outer truss frame 60, and therefore front travel assembly 110a, may be laterally offset by operation of side shifter assembly 64. Also, the agile steering capability of machine 20 maintains a level orientation for machine in traveling within conduit 28 and pipe sections 26.

In FIG. 22, pipe section 26c is first aligned generally with the opening of conduit 28 in preparation for joining of the pipe section 26c spigot formation 34 and conduit 28 bell formation 32. Selective actuation of cylinders 190 (FIG. 10) aligns the pipe section 26c within a vertical plane while side shifter assembly 64 positions needle beam 62, and therefore pipe section 26c within a horizontal plane. Rotational positioning of pipe section 26c, if necessary to place protective lining portion 270 (shown only in FIG. 22) above the floor of conduit 28, is accomplished by coordinated operation of roller sets 186.

In FIG. 23, actuation of cylinders 192 (FIG. 1) moves the pipe carriage assembly 180 longitudinally toward the conduit 28 to mount the pipe section 26c upon the opening of conduit 28. Reactive forces developed at the outrigger feet 134 and 160 are transferred through frame 60, thrust block 69, needle beam 62 and pipe carriage assembly 180 to urge pipe section 26c into abutment with conduit 28. Because the opening of conduit 28 is taken as being in grade and line, the spigot end of the pipe section 26, being supported at the opening of conduit 28, is considered in line and grade. The distal end, i.e. the bell formation 34 end, of the pipe section 26c is vertically positioned by additional operation of front pipe carriage cylinder 190a and horizontally positioned by operation of front side shifter assembly 64a. In FIG. 24, once the pipe section 26c is suitably positioned in line and grade, a block 30b is positioned at its distal end and shimmed as necessary to support the pipe section 26c in its final position as a part of conduit 28. At this time the weight of machine 20 is transferred to the pipe travel assembly 110 for repositioning to place the next pipe section 26d. Cylinders 190 are actuated to lower roller sets 186, the forward travel assembly 110a is lowered by actuation of cylinder 114 to obtain support within pipe section 26d, and cylinders 138 and 164 (FIG. 1) of outrigger support assembly 130 are actuated to raise outrigger feet 136 and 162, respectively. Drive motors 127 (FIG. 12) are then actuated to propel machine 20 forward. Steering of rear travel assembly 110c and front travel assembly 110a, as necessary, maintains a level orientation for machine 20.

In FIG. 25, when middle travel assembly 110b is within pipe section 26d, it is lowered by actuation of cylinder 116 and front travel assembly 110a is raised, unless front steering is needed, by actuation of cylinder 114. In this manner machine 20 traverses the space between pipe sections 26c and 26d. Machine 20 continues forward through pipe section 26d until the rear outrigger set 160 is above the support block 30b as shown in FIG. 26. In FIG. 26, front outrigger carriage 132 is positioned axially by actuation of cylinder 140 to place front outrigger feet 136 above the space separating pipe sections 26c and 26d. The outrigger support assembly 130 is thereby positioned to obtain a proper foothold for supporting machine 20 and pipe section 26d. Cylinders 138 and 164 are actuated to lower outrigger feet 136 and 162 as front and middle travel assemblies 110a and 110b are raised by actuation of cylinders 114 and 116, respectively. Machine 20 is then in position to lift and manipulate pipe section 26d into its final position as shown in FIG. 27 with a block 30c supporting its distal end in line and grade.

In FIG. 27, machine 20 has moved, in the manner described above, into position to lift and manipulate the pipe section 26e. More particularly, rear outrigger feet 162 have been positioned above support block 30c by movement of machine 20 and front outrigger feet 136 have been positioned beyond the distal end of pipe section 26e by longitudinal movement of front outrigger carriage 132. Outrigger feet 136 and 162 are lowered and the front and middle travel assemblies 110a and 110b are raised to establish a stable platform for placement of pipe section 26e in the manner described above.

In placing multiple pipe sections 26 as deposited upon temporary blocks 246 at the placement site, machine 20 adapts to the changing spacial relationship between suitable footholds for outrigger feet 136 and 162. Compare the spacial separation between pipe sections 26 in the illustration of FIGS. 21, 26 and 27. In FIG. 21, the pipe sections 26 are separated by the distance 250. The distance between block 30a and the space between pipe sections 26c and 26d is a function of the length of pipe section 26 and the distance 250. Compare, however, the distance between the block 30b in FIG. 26 and the space between pipe sections 26d and 26e. The distance separating these suitable footholds for outrigger feet 136 and 162 has increased relative to that needed for placement of pipe section 26c. More particularly, the distance has increased by approximately the distance 250. A similar increase in the space separating suitable footholds for outrigger feet 136 and 162 is, as represented in FIG. 27, an additional space 250. It may, therefore, be appreciated that the axial positioning capability of forward outrigger feet 136 plays an important role in the capability of machine 20 in placing multiple pipe sections 26. Axial positioning of forward outrigger feet 136 allows machine 20 to maintain a spacial relationship between the outrigger feet 136 and 162 and suitable footholds for these outrigger feet in sequentially placing multiple pipe sections 26 as delivered by the pipe transport crew upon blocks 246.

FIG. 28 illustrates placement of pipe section 26e in its final position upon support block 30d. As shown herein the machine 20 has placed three pipe sections, i.e. pipe sections 26c–26e, as deposited by the pipe transport crew. It will be understood, however, that the present invention is not limited to manipulation of three pipe sections 26. The number of pipe sections which machine 20 may manipulate from there position as deposited at the placement site is generally a function of the travel capability of outrigger carriage 132. In the illustrated embodiment carriage 132 of machine 20 travels approximately seven feet relative to outer truss frame 60 and can handle three or four pipe sections 26. A longer travel capability of carriage 132 would enable manipulation of additional pipe sections 26 from their position as delivered on temporary blocks 246.

FIG. 29 is a top view of the rail car loading site taken along lines 29—29 of FIG. 19. In FIG. 29, the process of rail car 200 loading is advantageously performed using a side track 40a of rail system 40 interconnected to the mainline track 40a at junction 40c, on the opposite side of downshaft 240 relative to pipe placement, and junction 40d, intermediate of downshaft 240 and the placement site. In this manner, the rail car 200 loading process may be executed, using a separate locomotive (not shown) on the portion of mainline track 40b at the base of downshaft 240 and adjacent the side track 40a. While the locomotive 242 is in transit to and from the placement site, a next load of rail cars 200 may be prepared for the next locomotive 242 trip. As locomotive 242 approaches the base of downshaft 240, it switches at junction 240 to the side track 40a to bypass the newly loaded assembly of rail cars 200 positioned on mainline track 40a. Locomotive 242 then uncouples from its empty assembly of rail cars 200 to leave the empty rail cars 200 on the side track 40a. Locomotive 242 then continues to the junction 40c where it re-enters the mainline track 40b to couple to the newly loaded assembly of loaded rail cars 200 for delivery to the placement site. Once the locomotive 242 departs for the placement site, the empty rail cars 200 left on side track 40a may be repositioned for loading on the mainline track 40b at the base of downshaft 240. In this manner of pipe section loading, locomotive 242 remains constantly in transit to and from the placement site carrying pipe sections 26 thereto and returning with its empty rail cars 200.

The separate tasks of pipe section 26 loading, transport and placement are thereby made substantially independent. Furthermore, while such operations are performed, the separate task of filling the tunnel 36 void exterior of pipe sections 26 may be accomplished from within conduit 28 by use of passageways, e.g. the passage 270 in FIG. 8, extending radially through pipe sections 26. Passageways 270 include a threaded aperture 272 and mating plug 274. Each pipe section 26 is provided with multiple such passageways 270 whereby void filling may be accomplished from within conduit 2 by introduction of concrete therethrough.

The total construction time for a given underground conduit constructed in accordance with the present invention may be completed with substantial reduction in overall time, and therefore expense. According to prior pipe section placement methods, only five to six pipe sections 26 can be placed in an eight-hour shift. It is believed that conduit construction according to the present invention, however, can place as many as twenty-four sections 26 in one eight-hour shift. According to prior methods of pipe section placement, wherein a single pipe section was delivered to and manipulated at the placement site, the length of the tunnel formation from the tunnel opening to the conduit opening played an important role in the overall construction time required. More particularly, because pipe section transport represented a substantial time consuming activity according to such prior methods, relatively longer tunnel length resulted in relatively longer construction project time. Pipe section placement in accordance with the present invention, however, wherein multiple pipe sections are carried on each trip to the placement site, represents a substantial increase in pipe transport efficiency, and therefore reduces the effect on overall construction time of the length of the tunnel section to the conduit opening. Substantial reduction in overall project time, especially for large underground conduit construction represents huge savings in cost.

It will be appreciated that the present invention is not restricted to the particular embodiment that has been described and illustrated, and that variations may be made wherein without departing from the scope of the invention as found in the appended claims and equivalents thereof. For example, the method is not limited to underground projects and may be applied to underwater as well as above ground conduit construction. The invention is not limited to a single forward outrigger being axially positionable to adapt as needed to establish suitable footholds in sequentially placing multiple pipe sections as delivered at a placement site.

We claim:

1. Apparatus for constructing conduit by placement of preformed pipe sections in end-to-end abutment, the apparatus comprising:
    transport means for simultaneously delivering a plurality of pipe sections in end-to-end axially spaced relation at a placement site;
    placement means independent of said transport means and traveling inside the conduit, adapted to extend out of said conduit and into a pipe section, said placement means including pipe section lifting means to individually and sequentially lift and manipulate said plurality of pipe sections into end-to-end abutment to form a conduit.

2. An apparatus according to claim 1 wherein said placement means includes outrigger means to establish suitable support points at respective ends of each pipe section with one of said support points residing in the conduit, thereby to carry the weight of said placement means and to lift and carry a pipe section for placement thereof, and mobile support means to move the placement means relative to said conduit and pipe sections to establish such support points relative to successive pipe sections as each of said plurality of pipe sections is sequentially moved into placement and becomes a part of the conduit.

3. An apparatus according to claim 2 wherein said outrigger means are adapted for relative axial movement to accommodate a changing separation between the conduit and pipe section to be placed as said plurality of pipe sections are engaged from positions as deposited at said placement site by said transport means.

4. A method of delivering a plurality of pipe sections to a placement site within a tunnel formation to construct a conduit therewith, the method comprising:

loading said multiple pipe sections upon an assembly of transport cars adapted for travel within the tunnel formation, for carrying said pipe sections, and for vertical positioning of said pipe sections relative to said transport cars;
transporting said plurality of pipe sections on said transport cars to said placement site whereat a plurality of blocks are positioned laterally adjacent said transport cars and positioned vertically at a height corresponding less than the maximum vertical positioning of said pipe sections by said transport cars and greater than the minimum vertical positioning capability of said transport car whereby said transport cars may pass between said blocks to position said pipe sections above said blocks; and
depositing said pipe sections at said transport site by vertically positioning said pipe sections relative to said transport cars to transfer said pipe sections to said support blocks.

5. A method according to claim 4 wherein said step of loading comprises sequentially positioning each of said plurality of pipe sections on blocks spaced apart sufficient distance for passage of said transport cars therethrough, positioning said cars between said blocks, and actuating said cars to vertically lift said pipe sections from said blocks.

6. A method according to claim 5 wherein said loading step further comprises relative positioning of said cars and said pipe sections during loading to establish a predetermined axial space relation between ones of said plurality of pipe sections as said pipe sections are carried by said cars.

7. A method according to claim 4 wherein said method further comprises the step of retrieving from said placement site said transport cars by movement of said transport cars from below said pipe sections and in the opposite direction from which said pipe sections were delivered.

8. A method according to claim 4 wherein said method further comprises integration of said pipe sections into a conduit formation by use of a pipe section placement machine adapted to manipulate said pipe sections as deposited upon said support blocks.

9. A method of conduit construction by end-to-end abutment of preformed pipe sections and placement by support blocks under finally positioned pipe sections, the method comprising:
    providing a first pipe section upon support blocks with its longitudinal axis aligned relative to an intended conduit placement line to define a conduit;
    positioning within said conduit an elongate pipe placement machine having travel means adapted for moving said machine within pipe sections including an ability to move between pipe sections in substantial longitudinal alignment but spaced apart, having pipe support means adapted for carrying a pipe section and moving the pipe section along the longitudinal axis of said machine, and having outrigger support means adapted to carry the weight of said machine while carrying a pipe section, first and second portions of said outrigger support means having a spaced relationship greater than the length of a pipe section;
    placing adjacent said conduit a plurality of pipe sections in end-to-end spaced relation thereamong and substantially along said intended conduit placement line, the order of placement of said plurality corresponding to adjacency relative to said conduit;

maintaining a spacing relationship between the spaced relationship of said first and second portions of said outrigger support means and the distance between a support block at the distal end of said conduit and the space between next and subsequent to next ones of said plurality of pipe sections, whereby said first portion of said outrigger support means may be positioned within said conduit and above said support block and said second portion of said outrigger support means may be positioned above the space between the next and subsequent to next such that the outrigger support means may establish necessary support point at opposite ends of said next pipe section to be placed.

10. A method according to claim 9 wherein the spaced relationship between said first and second portions of said outrigger support means includes axial positioning of at least one of said first and second outrigger portions along the longitudinal axis of said machine whereby said machine may adapt to a changing separation between said necessary support points at opposite ends of each next pipe section to be placed.

11. A machine used for constructing conduit by placement of preformed pipe sections in end-to-end abutment, the machine comprising;

a frame having a front end and a rear end, a needle beam mounted on the frame with lateral sliding movement relative thereto, and a controllable power source controlling the lateral sliding position thereof, a pipe-section carriage axially slidably mounted on the needle beam and a controllable power source controlling the axial sliding position thereof, outriggers mounted at the rear and at the front of the frame to be lowered for supporting the frame thereon, a rear roller support and a pair of axially spaced apart front roller supports, one of said front roller supports mounted on the frame and the other mounted on the needle beam, said roller supports alternately supporting the machine with the outriggers raised, and one of said front roller supports vertically movable to shift the front end support from one to the other of the front pair of roller supports, motive power for moving the machine on the roller supports for moving the machine out of the conduit and into a pipe section to be placed so as to extend the front outriggers through and past the end of the pipe section to be placed, the front roller supports being selectively raised and lowered to cross the gap therebetween, and said needle beam being selectively laterally adjusted relative to the frame to assist in aligning the machine in the pipe section as the machine is travelled therethrough.

12. A machine as defined in claim 11 wherein the forward most roller support is on the frame and is stearable.

13. A machine as defined in claim 11 including an outrigger carriage axially slidably mounted on the front end of the frame, said forward outrigger mounted on the outrigger carriage for axial positioning of the front outrigger relative to the rear outrigger.

14. A machine used for constructing conduit by placement of preformed pipe sections in end-to-end abutment, the machine comprising;

a frame having a front end and a rear end, a needle beam mounted on the frame with lateral sliding movement relative thereto, and a controllable power source controlling the lateral sliding position thereof, a pipe-section carriage axially slidably mounted on the needle beam and a controllable power source controlling the axial sliding position thereof, outriggers mounted at the rear and at the front of the frame to be lowered for supporting the frame thereon, a rear roller support and a pair of axially spaced apart front roller supports, one of said front roller supports vertically movable to shift the front end support of the machine from one to the other of the front pair of roller supports, motive power for moving the machine on the roller supports for moving the machine out of the conduit and into a pipe section to be placed so as to extend the front outriggers through and past the end of the pipe section to be placed, the front roller supports being selectively raised and lowered to cross the gap between the conduit end and the pipe section, and steering controls for steering said rear roller support and at least one of said front roller supports for selectively steering the machine into and through the pipe section to be placed.

15. A machine as defined in claim 14 wherein the forward most roller support is on the frame and is steerable.

16. A machine used for constructing conduit by placement of preformed pipe sections in end-to-end abutment, the machine comprising;

a frame having a front end and a rear end, a needle beam mounted on the frame with lateral sliding movement relative thereto, and a controllable power source controlling the lateral sliding position thereof, a pipe-section carriage axially slidably mounted on the needle beam and a controllable power source controlling the axial sliding position thereof, outriggers mounted at the rear and at the front of the frame to be lowered for supporting the frame thereon, a rear roller support and a pair of axially spaced apart front roller supports, one of said front roller supports vertically movable to shift the front end support of the machine from one to the other of the front pair of roller supports, motive power for moving the machine on the roller supports for moving the machine out of the conduit and into a pipe section to be placed so as to extend the front outriggers through and past the end of the pipe section to be placed, the distance between the forward outrigger and the rear outrigger enabling the rear outrigger to be positioned inside the conduit while permitting said front outrigger to be adjustably positioned at the opposite end of the pipe section to accommodate different spacings between the pipe section and the end of the conduit.

17. A machine as defined in claim 16 wherein the distance between the front and rear outriggers is adjustable to permit the desired placement of the rear outrigger within the conduit and to permit variations in the placement of the front outrigger to accommodate variations in the gap as between the conduit end and the pipe section to be placed.

18. A machine as defined in claim 17 wherein the front outriggers are mounted on a carriage that is axially slidably mounted on the machine end.

19. A method of extending a large conduit along a projected path through a tunnel by sequential assembly of preformed pipe sections to the conduit on site in the tunnel, said method comprising;

establishing a pipe section delivery station along the tunnel path, delivering pipe sections from the delivery station to the assembly site through the tunnel, said delivery provided by a transport apparatus travelling back and forth in the tunnel and depositing multiple pipe sections with each delivery cycle at the site in aligned spaced relation along the path of projected assembly, providing a separate elongate assembly apparatus residing in the conduit and having the maneuvering capability for projection of the apparatus through a first deposited pipe section, anchoring one end thereof in the conduit, anchoring the projected end that is extended through the pipe section to the tunnel floor, raising the pipe section so as to be supported on the apparatus and transporting the pipe section along the apparatus and into joining relation with the conduit end, securing said pipe section to thereby become a part of the conduit, and subsequentially projecting the machine through the next pipe section, said projecting capability adapted to adjust for increased spacing as between the conduit end and subsequent pipe sections along the path of projected assembly.

* * * * *